Dec. 21, 1937.  A. YURKOVITCH  2,103,106
BRACKET DEVICE
Filed Feb. 23, 1937
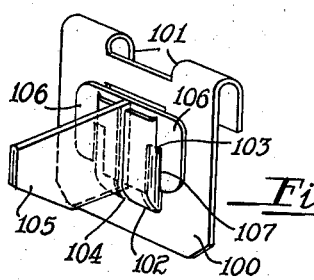
Fig.1.
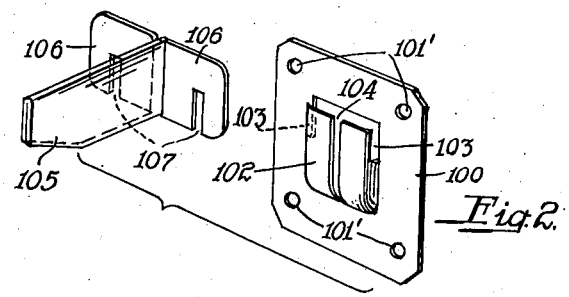
Fig.2.
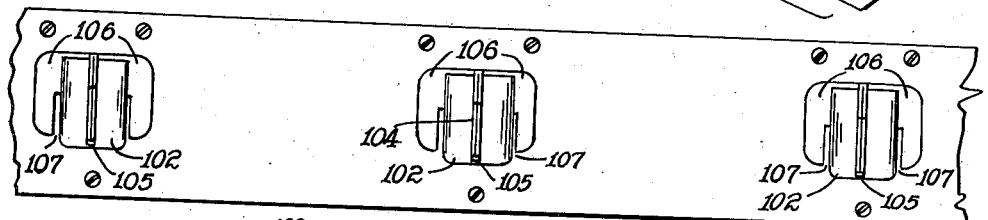
Fig.3.
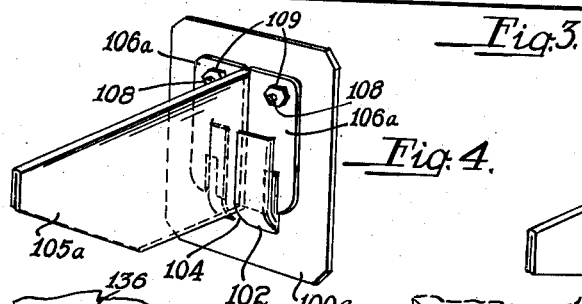
Fig.4.
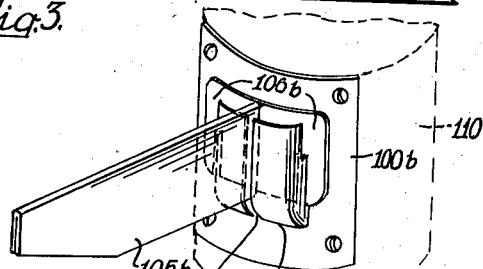
Fig.5.
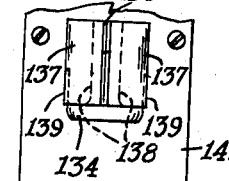
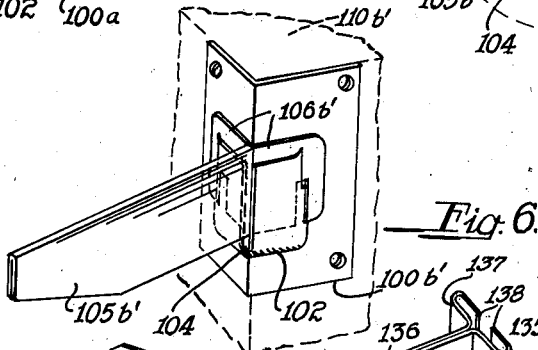
Fig.6.
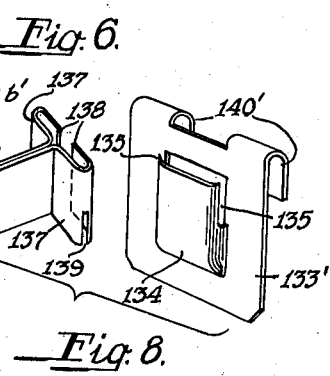
Fig.8.
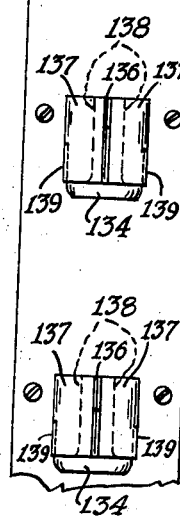
Fig.9.  Fig.7.
INVENTOR
Anton Yurkovitch
By Green & McCallister
His Attorneys Patented Dec. 21, 1937

2,103,106

UNITED STATES PATENT OFFICE 2,103,106

BRACKET DEVICE

Anton Yurkovitch, Pittsburgh, Pa.

Application February 23, 1937, Serial No. 127,214

3 Claims. (Cl. 248—224)

My present invention relates to bracket devices and more particularly to separable, movable and removable brackets, hangers and the like which have a wide variety of uses and which can be rapidly and easily assembled and disassembled forming, when assembled, devices of unusual strength and practicability.

A number of proposals have been made in the past in connection with devices of the general nature of my present invention but such have had recognized disadvantages. Some of these prior devices are relatively difficult and expensive to make, due to complicated configurations and frequently such must be made by intricate or slow manufacturing operations. Other prior devices along this line have been unsatisfactory in use in that they did not long retain their characteristics of making a satisfactory joint or were limited by adverse cost or space requirements.
Generally speaking, such prior devices were only adapted for a certain specific use and were not widely applicable to varying circumstances, locations or conditions. Thus there is still need for a simple, inexpensive bracket, hanger or the like which has a wide utility, which is readily installed and detached and which will give long and satisfactory service.

One of the objects of my present invention is to produce brackets and hangers which are simply and inexpensively made and which are widely applicable to various requirements of use.

Another object of my invention resides in producing plate-like brackets and hangers which, while requiring only a small space for installation, produce a firm and strong connection capable of supporting considerable weight and which at the same time are readily secured to and detached from a suitable support.

A still further object resides in the production of brackets, hangers and the like which are readily movable from one place to another and wherein the members constituting the brackets or hangers are themselves readily connected to and disconnected from each other.

Other and further objects and advantages of my present invention reside in the various structural and functional details which have been illustrated in the drawing and which will be hereinafter described as well as such other objects and advantages as will be appreciated by those skilled in this art.

In the accompanying drawing:

Fig. 1 is a perspective view of one preferred embodiment of the invention;

Fig. 2 is an exploded view of the parts of Fig. 1 but wherein one member is adapted for a different mode of connection to a support member;

Fig. 3 illustrates in front elevational view a fragment of a string of devices embodying the construction of Fig. 1;

Fig. 4 illustrates in perspective another form of the invention of Fig. 1;

Fig. 5 illustrates the application of the structure of Fig. 2 to a convex surface;

Fig. 6 illustrates the invention of Fig. 5 as applied to a corner or angular surface;

Fig. 7 illustrates in perspective a modified device embodying my present invention;

Fig. 8 is an exploded view of the parts of Fig. 7 but wherein one member is provided with hooks; and Fig. 9 illustrates in front elevational view a portion of a string of hangers in accordance with the embodiment of Fig. 7.

In accordance with my present invention, the bracket devices, hangers and the like are of such nature that with one exception (Fig. 4) the members constituting the bracket device or hanger are attachable to and removable from each other without the use of screws, bolts, nails, glue, etc. One of the members of the device is adapted to be attached to a supporting surface either by providing hook-like portions thereon or by nailing or screwing the same to a support. In the case of the device having hook-like portions this permits not only a sliding back and forth of the connecting device but allows it to be removed without disturbing the connection and to be hung on or at another point or location. The bracket devices or hangers are preferably made from sheet metal but may of course be made from any other suitable metallic or non-metallic material having requisite properties of strength, flexibility and long wear. They may be made by appropriate cutting, stamping, rolling, pressing, molding and/or casting operations. The invention is particularly adapted for display purposes in connection with counter displays or in connection with store window displays and by providing a support mounted in the manner of an easel and provided with slotted and unslotted portions a plurality of connecting devices and hangers can be used for display purposes by forming either shelves or brackets for articles to be displayed or devices from which articles can be hung or a combination of the above. The invention is, for example, useful in connection with household devices or articles like clothes driers and pot holders of such nature that they can be readily removed and replaced by an ornamental shelf or a shelf or bracket upon which an ornamental object may be placed. Likewise, various types of hooks and hangers for clothing, etc. in closets and cupboards can be readily detached and/or moved from place to place. The invention is useful in connection with hangers for light, power, telegraph and telephone poles, traffic signals and guides and in general for many domestic and industrial purposes.

Referring now to the drawing, it will be apparent that all the forms of the invention comprise generally a member provided with one or more pockets and/or grooves, slots, etc. and a member having one or more parts adapted to fit into said member and to be demountably interlocked therewith. These members, insofar as the terms are applicable, will be hereinafter respectively referred to as a pocketed member and an interlocking member. Both the pocketed member and the interlocking member may take a wide variety of forms or configurations as the principles whereon the present invention is based is applicable to so many different circumstances and locations. It is for this reason that I have illustrated a sufficiently large number of modifications to fully teach the structure and utility of my invention as well as its potential uses and applications for domestic and industrial uses.

Referring to Figs. 1 and 2 I have illustrated certain preferred forms of the invention, the constructions of the two figures being identical save that in Fig. 1 the plate-like member 100 is provided with hooks 101 and in Fig. 2 the plate-like member 100' is provided with apertures 101' for securing it to a non-metallic support or surface as will be understood. In Figs. 1 and 2 the bulged out metal pocket 102 is suitably formed by pressing, stamping or other suitable shaping operation and is provided not only with side slots 103 but with a central slot 104, the central slot extending the full length of the pocket and the side slots extending only approximately half-way down the sides of the pocket. The interlocking member is made of sheet metal or other suitable material which is folded over to form a doubled body portion 105 and the single-thickness ends of which spread laterally to form the two extensions 106, each of which has a vertical slot 107 extending from its lower edge about half way up into the extension. These slots are so spaced with relation to the central folded over portion of the member that they co-operate with the slotted pocket, i. e., the slots 107 are spaced from member 105 a distance equal to the spacing of slots 103 from slot 104.

In assembling either the construction of Fig. 1 or Fig. 2 the interlocking member is placed above the pocket in such manner that the doubled portion 105 thereof is positioned over the central slot 104 of the pocket and the slots 107 in the extensions are placed over the slots 103 in the sides of the pocket. Then the interlocking member is slid downwardly whereupon the doubled portion of the interlocking member slides down into the central slot of the pocket until the upper edge of slots 107 abut the lower edge of the slots 103 in the sides of the pocket. In this position the upper edge of the extensions 106 are substantially flush with the upper edge of the pocket although this is not intended to constitute a limitation in that regard. It is to be understood that the central portion of the interlocking member may be provided with any desired configuration and with any desired holes, slots or the like for attaching purposes since this form of interlocking member may support a shelf or other element of similar nature or may be used as a bracket or hanger from which to depend various objects.

As indicated in Fig. 3, the pocketed member 100'' may be formed as a lateral string of pockets having spaced pockets 102 therealong and in such a construction it is clear that not only a plurality of parallel interlocking members can be provided but that each interlocking member can be moved to any one of the pockets depending upon the requirements of the particular installation. Two parallel strings of pockets can of course also be used and if desired the interlocking member can be made long enough to reach across the space between the strings of pockets and both ends of the interlocking member can be provided with the construction shown. In addition, the string of pockets can be vertical instead of horizontal and used either singly or in pairs as above indicated, in which event a construction will be provided whereby the level of the interlocking members can be raised or lowered as desired.

In Fig. 4 the construction is substantially that of Fig. 2 except that the lateral extensions 106a as well as the body portion 105a of the interlocking member are made of a greater vertical height and the lateral extensions may be provided with holes registering with holes in the plate-like member 100a so that in a case where unusual weights or strains are encountered the two members may be additionally detachably secured together by passing screws or bolts 108 therethrough on which nuts 109 are provided. Assembly and disassembly in this case additionally require the insertion and removal respectively of the screw and nut assemblies.

Fig. 5 is substantially the same as Fig. 2 except that the plate-like member 100b and the lateral extensions 106b of the interlocking member 105b are formed on the arc of a circle thereby making it possible to make connection with a curved or convex support or surface as indicated by the portion 110 in dotted lines. In other words, member 100b is concavo-convex.

Fig. 6 is the same as Fig. 5 in its construction except that the construction of Fig. 6 illustrates the application of this form of the invention to a corner or angular supporting surface 110b'. In the illustration shown the plate-like member 100b' is bent substantially to form two portions at right angles to each other and the lateral extensions 106b' of the interlocking member 105b' are bent complementary thereto. The interlocking members of Figs. 5 and 6 may terminate flush with the top of the pocket as in Fig. 2 or may extend somewhat above the pocket as shown in Fig. 4.

In Figs. 7 and 8 I have illustrated other new and useful forms of the invention thus evidencing the wide applicability thereof. In Figure 7 the plate-like member 133 is provided with a pocket 134 which is open at its top, closed at its bottom and provided with side slots 135 of suitable extent but no central slot such as in Figs. 1–6, inclusive. The interlocking member 136 is formed generally similar to that of Fig. 1 but in this case the extensions are U-shaped. The lateral extensions 137 are somewhat arcuate and the inward extensions 138 are roughly parallel thereto, the arcuate nature of extensions 137 permitting proper cooperation with pocket 134. Slots 139 are provided where the arcuate and inward extensions merge, i. e., at the bends of the U's and these slots extend upwardly for a distance substantially equal to or slightly less than the distance from the bottom of slots 135 in the pocket 134 to the bottom of the pocket. It will be noted from Fig. 7 in particular that the somewhat arcuate or curvilinear extensions 137 are disposed on the outside of the pocket 134 in contradistinction to previously described modifications and the particular configuration of these extensions in any particular instance is substantially complemental to the more or less rounded surface of the pocket. In Fig. 7 the plate-like member 133 is provided with holes 140 for the reception of screws and in Fig. 8 the plate-like member 133' is provided with hooks 140', the purpose of which will be understood from what has preceded. Otherwise, Figure 8 is the same as Fig. 7 as indicated by the use of the same numerals.

In Fig. 9 I have illustrated how the construction of Fig. 7 may be used in the form of a string shown as a vertical string but which may be horizontal as pointed out in connection with Fig. 3. The purposes and advantages of either the vertical string or the horizontal string will be understood from the above discussion of Fig. 3. The use of the same numerals on Fig. 9 as on Fig. 7 indicates the similarity of the various parts. In Fig. 9, however, the plate-like member 141 is elongated.

The foregoing description is intended more as illustrative than limitative, as it is apparent that within the scope and principles of the present invention many specific structural forms of connection may be produced. While I have disclosed a rather wide variety of connections, all constructions which fall within the terms of the subjoined claims are intended to be a part hereof. While I have set forth a number of various uses for the various connections it is to be understood that this is not intended as an exhaustive summation of possible uses and in particular I have found that connections of one or another of the above types are especially useful in connection with steel and wood fixtures for stores, offices, hotels and restaurants. The invention also finds application in connection with lockers, stoves, refrigerators and furniture of various types as well as for mounting meters or other measuring instruments for use with telephones, water, gas and electricity. The invention is applicable to pictures and for attaching upholstery, ashtrays, lights, license tags and the like on automobiles, buses, trucks, trailers, steamships and trains. I have found that the invention is applicable to connections in building structures, in making joints of metal to wood or metal to metal and in such building accessories as mantel pieces, porch canopies, plumbing and electric fixtures, etc.

It is also to be understood in connection with the foregoing description that any of the modifications embodying a plate-like member can be made in either a vertical or a horizontal string, as shown in Figs. 3 and 9, or in pairs of strings oppositely mounted and disposed as described in connection with Fig. 3. Where the invention is used with an article made of sheet material I also wish it to be understood that in such a case the pocketed member need not be a separate and independent member but may be formed in and from the material of such articles. This particularly applies in cases like lockers, ovens, refrigerators, cabinets and analogous products.

Having thus described my invention, what I claim is:

1. A bracket device comprising a plate-like member adapted to be attached to a support and having a bulged out pocket formed therein, said pocket having a narrow central slot extending throughout its length and having slots extending partway down the sides thereof and an interlocking member composed of a body portion of doubled sheet material with lateral extensions having slots extending partly up therethrough and spaced from the doubled sheet material body portion a distance which is equal to the distance of the side slots from the central slot of said pocket.

2. A bracket device comprising a plate-like member adapted to be attached to a support and having a bulged out pocket formed therein, said pocket having slots extending partway down the sides thereof and an interlocking member composed of a body portion of sheet material with lateral extensions having slots extending partly up therethrough and spaced from the sheet material body portion a distance which is equal to the distance of the side slots from the central slot of said pocket.

3. A bracket device comprising a plate-like member adapted to be attached to a support and provided with a centrally disposed struck-up pocket, said pocket being closed on the bottom and open on the top and provided with slots extending from the top toward the bottom but terminating short of the bottom and an interlocking member composed of a doubled sheet material body portion provided with U-shaped extensions upwardly slotted from the bends of said U's and so constructed that one side of each of said U's co-operates with the outer surface of said pocket and the other side of each of said U's extends within said pocket, the slots in the pocket and the slots in the U's interfitting and the interlocking member contacting with said pocket throughout substantially the entire length thereof.

ANTON YURKOVITCH.